US012396918B1

(12) United States Patent
Huang et al.

(10) Patent No.: US 12,396,918 B1
(45) Date of Patent: Aug. 26, 2025

(54) NEGATIVE PRESSURE MASTURBATOR CUP

(71) Applicant: Shenzhen Alltokee Technology Co., Ltd, Shenzhen (CN)

(72) Inventors: Minyi Huang, Shenzhen (CN); Jian Luo, Shenzhen (CN)

(73) Assignee: Shenzhen Alltokee Technology Co., Ltd, Shenzhen (CN)

( * ) Notice: Subject to any disclaimer, the term of this patent is extended or adjusted under 35 U.S.C. 154(b) by 0 days.

(21) Appl. No.: 19/038,880

(22) Filed: Jan. 28, 2025

(30) Foreign Application Priority Data

Jan. 15, 2025 (CN) ......................... 202520097284.4
Jan. 15, 2025 (CN) ......................... 202520100621.0

(51) Int. Cl.
*A61H 19/00* (2006.01)
*A61H 9/00* (2006.01)

(52) U.S. Cl.
CPC ........... *A61H 19/32* (2013.01); *A61H 9/0057* (2013.01); *A61H 2201/1238* (2013.01); *A61H 2201/1695* (2013.01); *A61H 2205/087* (2013.01)

(58) Field of Classification Search
CPC ...... A61H 2205/087; A61H 2201/1695; A61H 2201/1238; A61H 19/34; A61H 19/32; A61H 19/30; A61H 19/00; A61F 5/41
See application file for complete search history.

(56) References Cited

U.S. PATENT DOCUMENTS 11,344,470 B2 * 5/2022 Sedic ........................ A61F 5/41
11,571,358 B2 * 2/2023 Shahoian ................ A61F 5/451
2023/0044372 A1 * 2/2023 Liu ...................... A61H 9/0007

* cited by examiner

*Primary Examiner* — Samuel G Gilbert
(74) *Attorney, Agent, or Firm* — ScienBiziP, P.C.

(57) ABSTRACT

A negative pressure masturbator cup includes an accommodating cavity, a cup main body, and a control structure. The accommodating cavity is configured to accommodate a soft colloid. The cup main body has an elastically deformable body. The control structure has a negative pressure generator. When the control structure controls the negative pressure generator to generate a negative pressure, the soft colloid is pulled by the negative pressure generated by the negative pressure generator, and the elastically deformable body is deformed in a direction towards the accommodating cavity.

20 Claims, 6 Drawing Sheets

NEGATIVE PRESSURE MASTURBATOR CUP

CROSS-REFERENCE

This application claims the benefit of priorities from the following patent applications filed in China: Chinese Patent Application Ser. No. CN 202520100621.0, filed on Jan. 15, 2025, and Chinese Patent Application Ser. No. CN 202520097284.4, filed on Jan. 15, 2025.

TECHNICAL FIELD

The present invention relates to the field of adult products, in particular to a negative pressure masturbator cup.

BACKGROUND ART

In a background of continuing development of the adult product market, a masturbator cup is a common and widely used sexual product. However, most of the masturbator cups on the market have certain limitations in the cup structure. For example, the cup diameter is usually fixed, which means that in the process of use, the masturbator cup only provides relatively single and monotonous stimulation manners, and may not provide a favorable experience.

DETAIL DESCRIPTION

Figure 1:
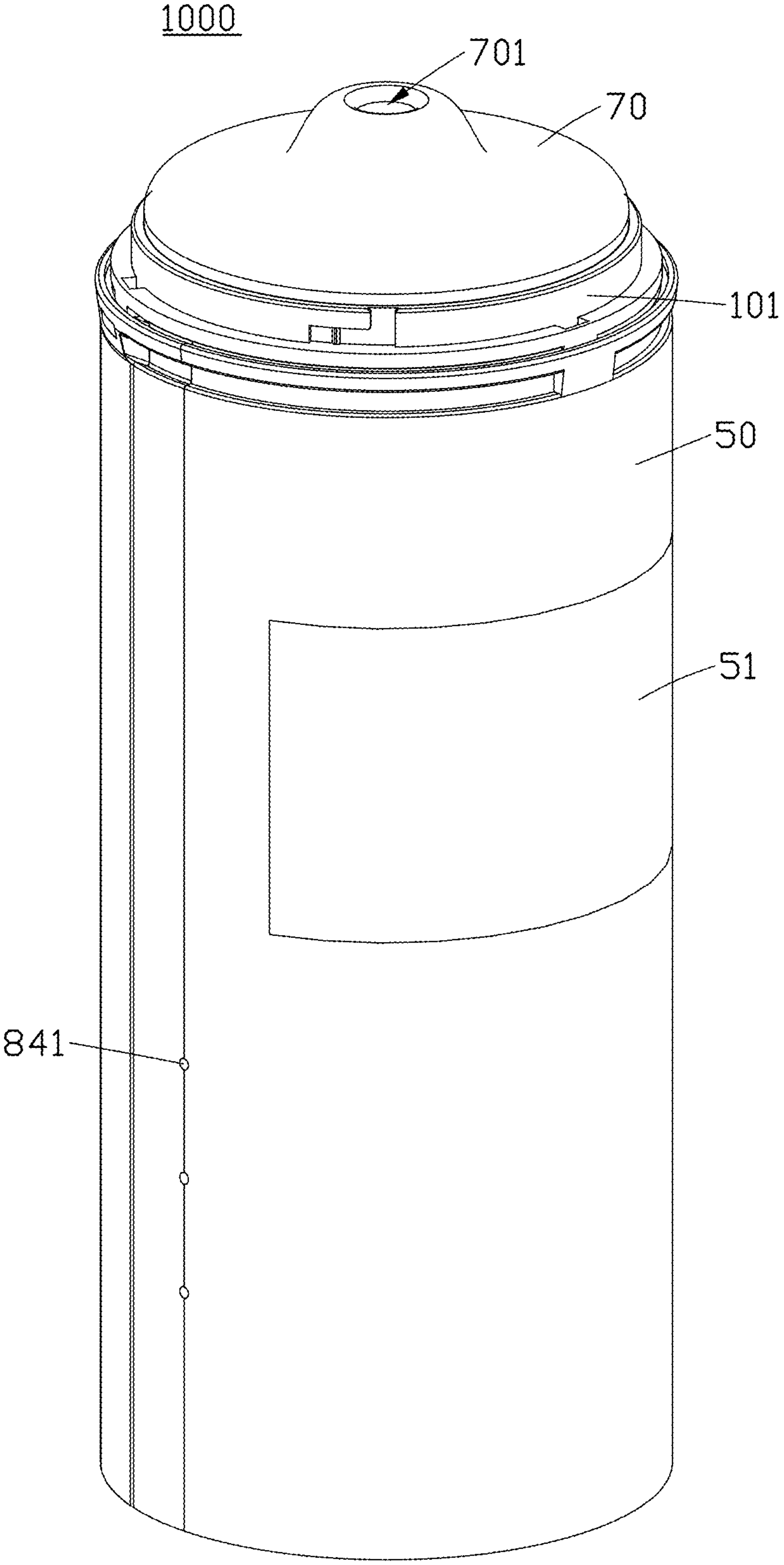
FIG. 1 is a three-dimensional diagram showing a negative pressure masturbator cup of the present disclosure.
Figure 2:
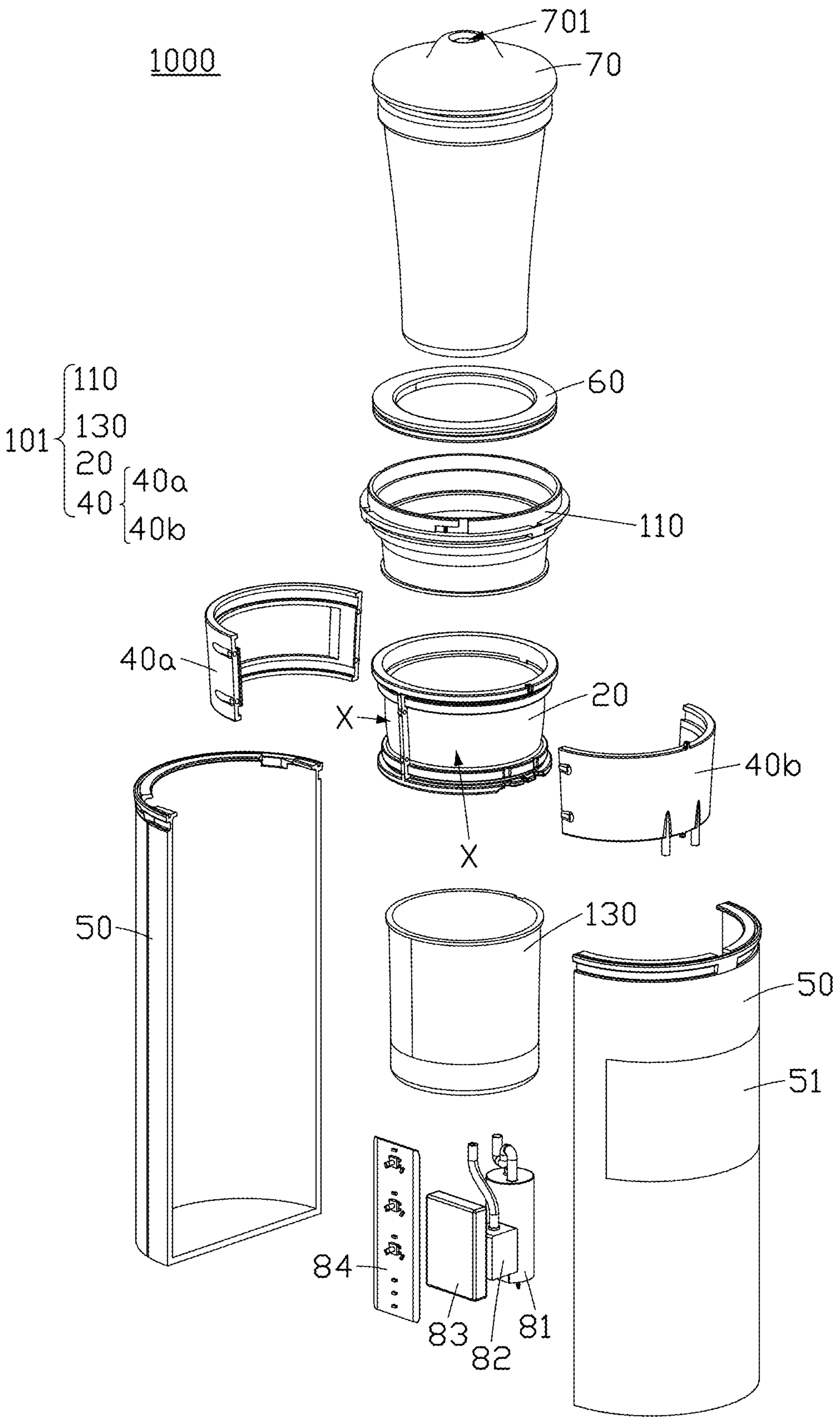
FIG. 2 is an exploded three-dimensional diagram showing main components of the negative pressure masturbator cup shown in FIG. 1.
Figure 3:
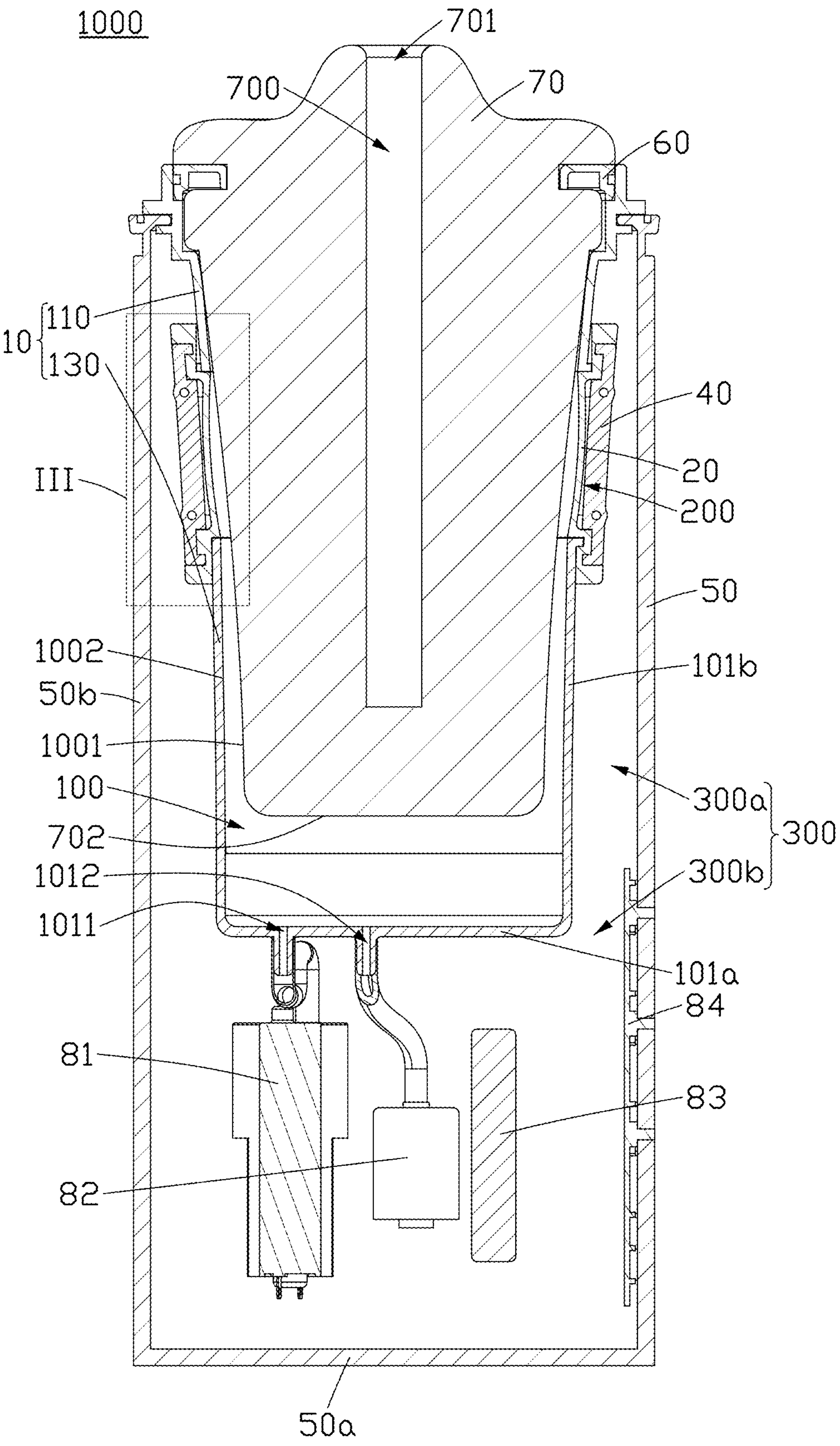
FIG. 3 is a sectional view showing the negative pressure masturbator cup shown in FIG. 1.
Figure 4:
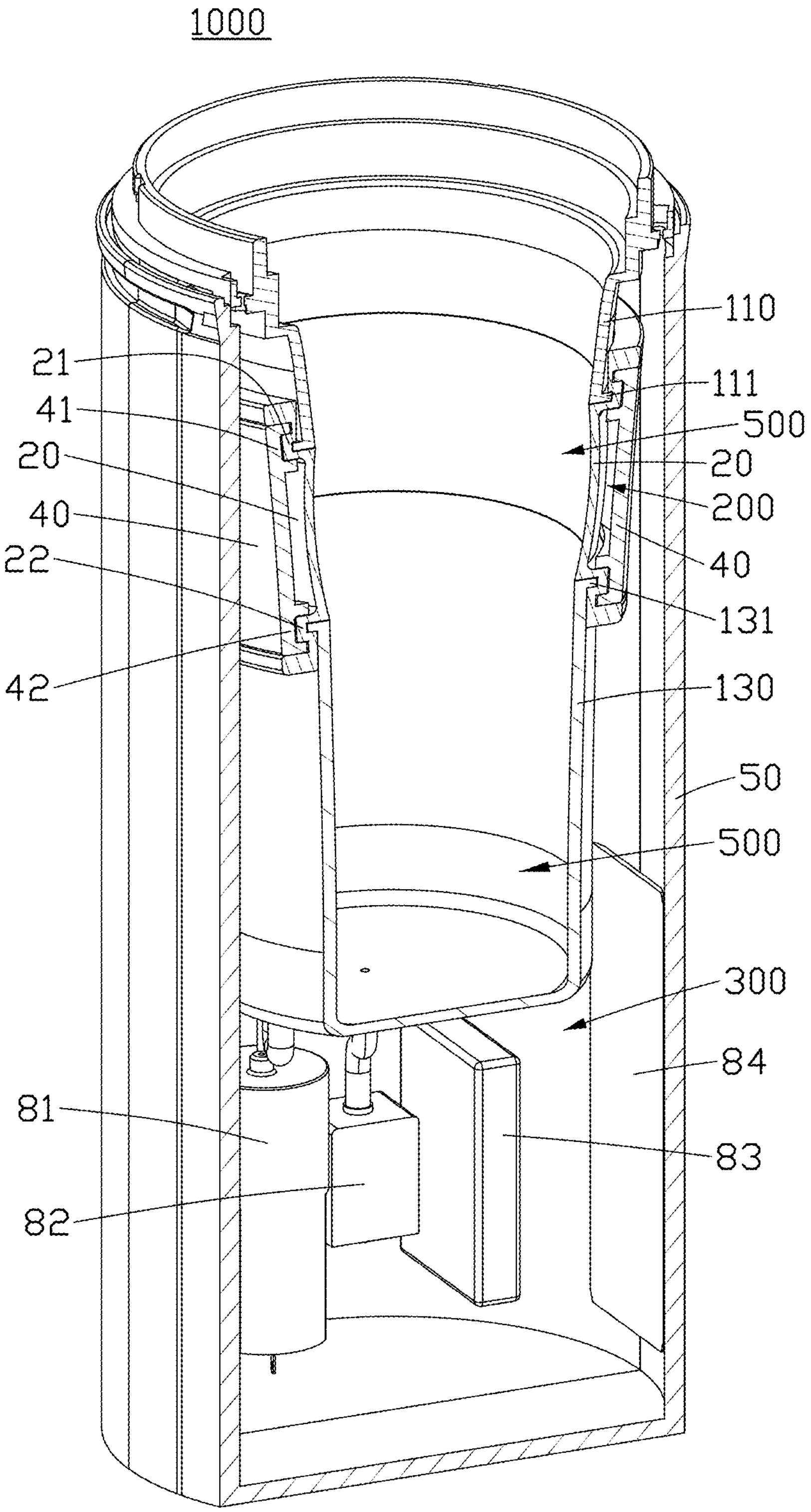
FIG. 4 is a schematic three-dimensional diagram showing a sectioned portion of the negative pressure masturbator cup of shown in FIG. 1.
Figure 5:
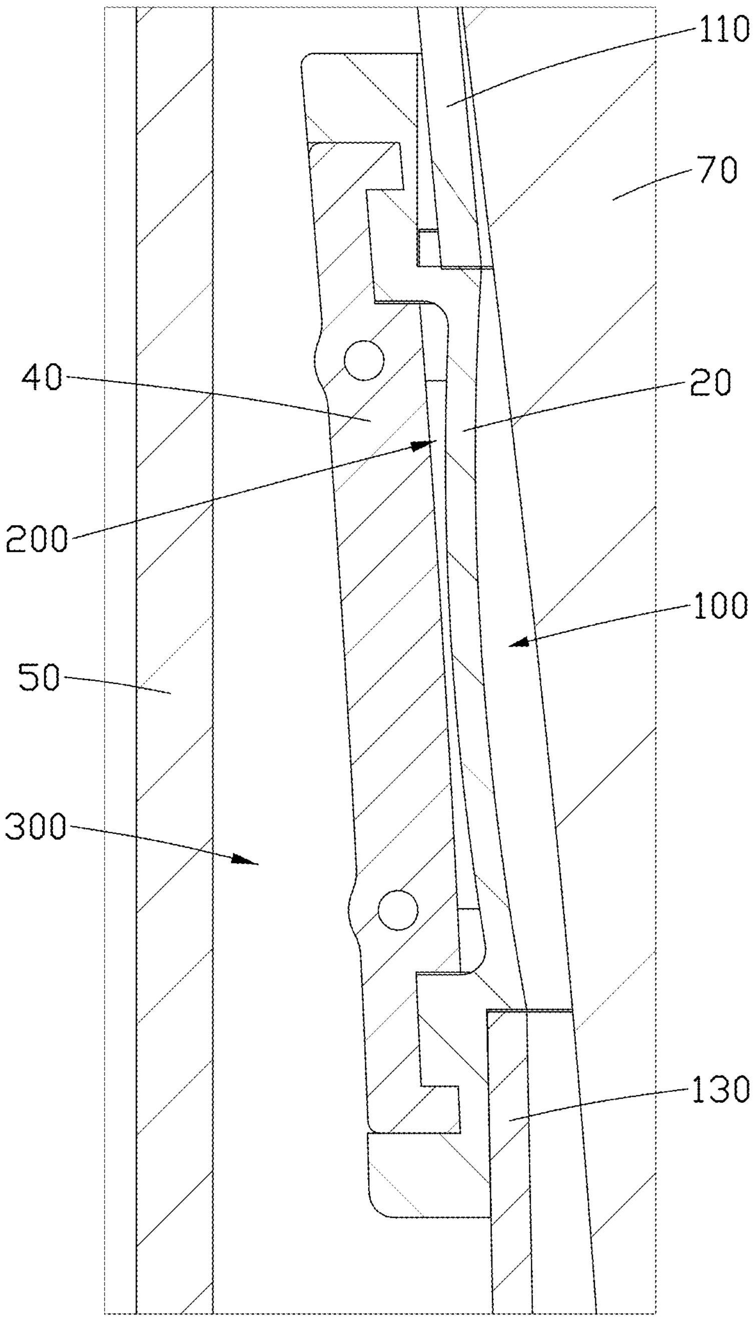
FIG. 5 is an enlarged view showing part III of FIG. 3.

Referring to FIG. 1 to FIG. 6, the negative pressure masturbator cup 1000 with an adjustable inner diameter in the embodiment of the present disclosure is of a cylinder structure as a whole, and includes an outer cylinder 50, a cup main body 101, a soft colloid 70, and a control structure 80.

As shown in FIG. 3 to FIG. 6, a clearance cavity 300 is formed inside the outer cylinder 50, and the clearance cavity 300 is configured to accommodate and mount the cup main body 101 and the control structure 80. End edges at each side of the outer cylinder 50 and the cup main body 101 are open and are removably connected, and the bottom of the outer cylinder 50 and the bottom of the cup main body 101 are spaced apart, such that the above clearance cavity 310 is formed between the outer cylinder 50 and the cup main body 101. The clearance cavity 310 includes a first cavity 310*a* arranged between a bottom wall 101*a* of the cup main body 101 and a bottom wall 50*a* of the outer cylinder 50 and a second cavity 310*b* arranged between a side wall 101*b* of the cup main body 101 and a side wall 50*b* of the outer cylinder 50, and the two cavities 310*a* and 310*b* are connected to each other. In the present embodiment, the outer cylinder body 50 further includes an opening portion 501 corresponding to the opening of the cylinder body and a bottom 502 corresponding to the bottom wall 50*a*, and the depth of the cup main body 101 is less than the depth of the outer cylinder body 50, and the inner diameter decreases gradually from the opening portion 501 towards the bottom 502, thereby forming the first cavity 310*a* and the second cavity 310*b*. It should be appreciated that, in other embodiments, the cup main body and the outer cylinder may also have other structures and shapes. A first vent 1011 and a second vent 1012 are formed on the bottom wall 101*a* of the cup main body 101, and the first vent 1011 and the second vent 1012 penetrate through the bottom wall 101*a*, respectively, such that the second cavity 310*b* is connected with an inner cavity 500 of the cup main body 101, and a gas channel is formed between the first cavity 310*a*, the second cavity 310*b* and the inner cavity 500 of the cup main body 101.

The inner cavity 500 of the cup main body 101 is formed as an accommodating cavity for accommodating the soft colloid 70. The gap between the cup main body 101 and the soft colloid 70 is formed as a controllable gas cavity 100. Specifically, the controllable gas cavity 100 is formed by clamping gas between a first wall surface 1001, which is the outer surface 1001 of the soft colloid 70, and a second wall surface 1002, which is the inner surface 1002 of the cup main body 101. The first wall surface 1001 and the second wall surface 1002 are spaced apart from each other. The controllable gas cavity 100 becomes a negative pressure state by discharging gas through the control structure 80, so that a portion of the side wall 101*b* of the cup main body 101 has a function of adjusting the inner diameter. The cup main body 101 includes a hard material portion and an elastically deformable body 20 exposed to the accommodating cavity and forming a portion of a side wall of the cup main body 101, and the hard material portion and the elastically deformable body 20 are connected in a sealing manner to connect the elastically deformable body 20 to the outer cylinder 50. The elastically deformable body 20 may be deformed concavely towards the side of the cup main body 101 under the effect of a gas pressure difference, thereby changing the inner diameter of the side wall 101*b* of the cup main body 101. In the present embodiment, the elastically deformable body 20 is an annular elastic material layer having a pre-determined width, and acts as a portion of the side wall 101*b* of the cup main body 101. A thickness of the elastic material layer at a periphery region of the elastically deformable body 20 is greater than a material thickness of the elastic material layer at a middle region of the elastically deformable body 20, thereby forming a concave region X with a U-shaped cross-section in the middle region between the two peripheries. This structure is more conducive to maintaining a certain shape of the elastically deformable body, and is more conducive to fixation and shrinkage deformation thereof. The hard material portion is sleeved on the elastically deformable body 20 and is adapted to the periphery of the elastically deformable body 20. In the present embodiment, the hard material portion includes a clamping member 40 sleeved to the middle region of the elastically deformable body 20, the clamping member 40 includes a first clamping portion 40*a* and a second clamping portion 40*b*, the first clamping portion 40*a* and the second clamping portion 40*b* are arranged opposite to each other and are sleeved to the middle region of the elastically deformable body 20 corresponding to the concave region X. In some embodiments, a convex rib is arranged at the middle region of the elastically deformable body 20, and two opposite ends of the first clamping portion 40*a* and the second clamping portion 40*b* are arranged in close proximity on two opposite sides of the convex rib.

The hard material portion further includes a cup body portion 10, and the elastically deformable body 20 are sandwiched between the cup body portion 10 and the clamping member 40, such that the hard material portion and the elastically deformable body 20 are connected tightly.

The cup body portion 10 covers each end edge of the elastically deformable body 20 from one side of the elastically deformable body 20, e.g., an inner side, and the material hardness of the cup body portion 10 is greater than that of the elastically deformable body 20. The clamping member 40 covers the end edge of the elastically deformable body 20 from the other side of the elastically deformable body 20, e.g., an outer side, and the hardness of the clamping member 40 is also greater than that of the elastically deformable body 20. The cup body portion 10 has a hardness higher than a hardness of the elastically deformable body 20, and the clamping member 40 has a hardness higher than the hardness of the elastically deformable body 20, such that the cup body portion 10 and the clamping member 40 stably maintain the elastically deformable body 20.

Each end edges of the elastically deformable body 20 is sealed by being sandwiched between the cup body portion 10 and the clamping member 40, such that a wall surface of the cup body portion 10 is sealed. The elastically deformable body 20 is provided with a first upper clamping portion 21 at the periphery of the upper end and is provided with a first lower clamping portion 22 at the periphery of the lower end. At one side of the elastically deformable body 20, the first hard material portion is provided with a cup mouth portion 110 at an upper end of the elastically deformable body 20 and is provided with a cup bottom portion 130 at a lower end of the elastically deformable body 20. The cup mouth portion 110 forms the cup mouth of the cup main body 101 and covers the upper end of the elastically deformable body 20, and the cup mouth portion 110 is provided with a second upper clamping portion 111 corresponding to the first upper clamping portion 21. The cup bottom portion 30 forms a cup bottom of the cup main body 101 and covers the lower end of the elastically deformable body 20, and the cup bottom portion 30 is provided with a second lower clamping portion 131 corresponding to the first lower clamping portion 22. At the other side of the elastically deformable body 20, a third upper clamping portion 41 is arranged at an upper end of the second hard material portion 40 corresponding to the first upper clamping portion 21, and a third lower clamping portion 42 is arranged at a lower end of the second hard material portion 40 corresponding to the first lower clamping portion 22, such that the second upper clamping portion 111 and the third upper clamping portion 41 are buckled to both sides of the first upper clamping portion 21 of the elastically deformable body 20 in a clamping manner, and the second lower clamping portion 131 and the third lower clamping portion 42 are buckled to both sides of the first lower clamping portion 22 of the elastically deformable body 20 in a clamping manner, then the hard material portion and the elastically deformable body 20 are tightly connected, and the cup main body 101 has a simple structure and is easy to mount.

Herein, an airbag space 200 may be formed between the side, opposite to a side of the controllable gas cavity 100, of the elastically deformable body 20 and the clamping member 40. The airbag space 200 may be in an atmospheric pressure state, but the airbag space 200 may also not be limited to the atmospheric pressure state as long as the pressure in the airbag space 200 is higher than that in the controllable gas cavity 100 and is sufficiently high to allow the elastically deformable body 20 to be deformed concavely.

The soft colloid 70 is accommodated in the accommodating cavity 500 of the cup main body 101, and is made of soft materials such as silicone, rubber, and other soft materials with good skin-friendliness and high softness. The soft colloid 70 is internally provided with an accommodating channel 700 connected to the outside, and one end of the accommodating channel 700 is open to form an accommodating port 701, and the other end is closed. The accommodating channel 700 is configured to accommodate the penis (sexual organ) 1. The soft colloid 70, due to its own material properties, effectively blocks the cup mouth of the cup main body 101, ensuring effective sealing between the soft colloid 70 and the cup main body 101. This facilitates the control of the gas pressure in the controllable gas cavity 100 between the soft colloid 70 and the cup main body 101 by the control structure 80, and therefore the gas between the soft colloid 70 and the cup main body 101 is sometimes also called the controllable gas cavity 100. In the outer cylinder 50, the accommodating channel 700 is located at the center, and the controllable gas cavity 100 is arranged on the periphery with the accommodating channel 700 at the center. Moreover, the gap cavity 300 is arranged on the periphery of the controllable gas cavity 100.

In the controllable gas cavity 100, the first wall surface 1001 is closer to the accommodating channel 700 than the second wall surface 1002. Under atmospheric pressure, one side of the elastically deformable body 20 communicates with the controllable gas cavity 100 and the first wall surface 1001 is spaced apart from the second wall surface 1002. In other words, a gap defines between the elastically deformable body 20 and the soft colloid 70, thereby ensuring a space for the elastically deformable body 20 to be deformed concavely. Another side of the elastically deformable body 20 is isolated from the controllable gas cavity 100. When the controllable gas cavity 100 is controlled to have a gas pressure lower than the gas pressure at the other side of the elastically deformable body 20, the controllable gas cavity 100 becomes a negative pressure, and under this negative pressure, the elastically deformable body 20 is deformed concavely towards the side of the cup main body 101 under a gas pressure difference, and with an increase in the gas pressure difference, the elastically deformable body 20 gradually contacts with and squeezes the accommodating channel 700 of the soft colloid 70 to deform the accommodating channel 700. Specifically, the elastically deformable body 20 squeezes the first wall surface 1001 to move towards the center of the accommodating channel 700, forcing a portion of the accommodating channel 700 to recess towards the center (i.e., to narrow). On the other hand, the part of the soft colloid 70 that is not arranged opposite to the elastically deformable body 20 bulges and deforms to moves closer to the second wall surface 1002 in a direction away from the accommodating channel 700 under the effect of the negative pressure. At this time, the bottom surface 702 of the soft colloid 70 may be pulled by the negative pressure to approach the bottom wall 101*a* of the cup main body 101. Therefore, in addition to the radial deformation, the depth (i.e., length) of the accommodating channel 700 may also become longer under the negative pressure.

In some embodiments of the present disclosure, in order to further ensure sealing between the soft colloid 70 and the cup main body 101, a sealing ring 60 is arranged between the soft colloid 70 and the cup main body 101.

In some embodiments of the present disclosure, the inner wall of the accommodating channel 700 may be designed to present a shape of wrinkles, bumps and the like, thereby enriching sexual experience from a tactile level by contacting with and rubbing against the penis 1, and providing the user with delicate and layered stimulation feelings.

The control structure 80 is accommodated within the first cavity 310*a*. The control structure 80 includes a negative pressure generator 81 controlled by the control structure 80, an electromagnetic valve 82 controlled by the control structure 80, a battery 83, a control circuit 84, and other electronic components. The negative pressure generator 81 is connected to the controllable gas cavity 100, and the negative pressure generator 81 is controlled by the control structure 80 to generate a negative pressure, such that when the negative pressure generator 81 is controlled to operate, gas in the controllable gas cavity 100 is discharged, so as to gradually form a negative pressure, i.e., forming a vacuum cavity. In the present disclosure, “vacuum cavity” includes a vacuum state and a near-vacuum state. When the negative pressure generator 81 operates to form a vacuum cavity in the controllable gas cavity 100, the soft colloid 70 is stretched inside the controllable gas cavity 100 through its own material properties, and an inner wall of the soft colloid 70 exerts a tensile force on the penis 1 towards a direction of the cup body of the cup main body 101, so as to stimulate the penis 1.

In some embodiment of the present disclosure, the negative pressure generator 81 is connected to the controllable gas cavity 100 through the first vent 1011.

When the negative pressure generator 81 is controlled to generate the negative pressure, a gas discharge channel to discharge is formed from an interior of the cup main body 101 to the first vent 1011, and the electromagnetic valve 82 is controlled to close the second vent 1012 to block air flow from an exterior of the cup main body 101 into the interior of the cup main body. As time passes, the controllable gas cavity 100 becomes the negative pressure state.

When the negative pressure generator 81 is not controlled (i.e. turned off) to generate the discharge to generate the negative pressure, the electromagnetic valve 82 is controlled to establish a connection between the controllable gas cavity 100 and the clearance cavity 310, opens the second vent 1012 to facilitate the air flow gas from the exterior of the cup main body 101 into the interior of the cup main body 101 through the second vent 1012. As time passes, the amount of gas in the controllable gas cavity 100 gradually increases, and the controllable gas cavity 100 restores to the atmospheric pressure state.

The battery 83 provides power required for operation to various electronic components. The control circuit 84 controls the action of each electronic component and may include an operation portion 841 such as control buttons, switch buttons.

The elastically deformable body 20 is annularly arranged on the side wall 101*b* of the cup main body 101, exerting a squeezing force on the soft colloid 70 in its circumferential direction, thereby bringing a sexually stimulating experience that is different from a pulling force of the negative pressure exerted directly on the soft colloid 70. Owing to tight connection between the hard material portion and the elastically deformable body 20, gas between the elastically deformable body 20 and the hard material portion is effectively sealed, and since gas between the soft colloid 70 and the cup main body 101 is effectively sealed, gas in the controllable gas cavity 100 can be controlled reliably.

In some embodiments of the present disclosure, the cup main body 101 may be a whole body, the hard material portion is an integrated structure, the hard material portion is connected to the elastically deformable body 20 and the connecting portion is fused to be integrated, such that the hard material portion and the elastically deformable body 20 are tightly connected, and the structure in this manner is simpler.

In some embodiments of the present disclosure, the elastically deformable body 20 is annularly arranged on the side wall 101*b* of the cup main body 101, and the hard material portion includes a cup mouth wall portion forming a cup mouth of the cup main body and a cup bottom wall portion forming a cup bottom of the cup main body. By using the elasticity of the elastically deformable body 20, the elastically deformable body 20 is elastically sleeved between the cup mouth wall portion and the cup bottom wall portion, and the hard material portion and the elastically deformable body 20 are tightly connected, and in this method, the structure is simple and mounting is easy.

In some embodiments of the present disclosure, the airbag space 200 may define one or more regions as desired, such that the elastically deformable body 20 forms one or more structures corresponding to each of the one or more regions of the airbag space 200, the one or more structures of the deformable body 20 are deformed concavely toward the side of the cup main body 101, and such structures play an important role in subsequent use. The height, size and shape of the recesses may be the same or different between the plurality of regions.

In some embodiments of the present disclosure, the elastically deformable body 20 comprises a plurality of elastically deformable sub-bodies 20 which are arranged on a side wall 101*b* of the cup main body 101, e.g., a plurality of elastically deformable bodies 20 may be spaced apart along a direction that is intersected with the radial direction, thereby realizing diversified stimulation feelings and satisfying the needs of different users.

In some embodiments of the present disclosure, the side wall 50*b* of the outer cylinder 50 is provided with a light-transmitting viewable window 51, and an opening is formed to penetrate through the overlapping portion of the viewable window 51 of the soft colloid 70, such that the soft colloid 70 will not block the viewable window 51, and the user can observe the changing state of the accommodating channel 700 through the viewable window 51. In particular, when the elastically deformable body 20 is arranged facing towards the viewable window 51, the user can visually observe a change in the state of the soft colloid 70 as the soft colloid 70 gradually rises under the squeezing of the elastically deformable body 20 through the viewable window 51, so as to enrich the sexual experience from a visual level.

Figure 6:
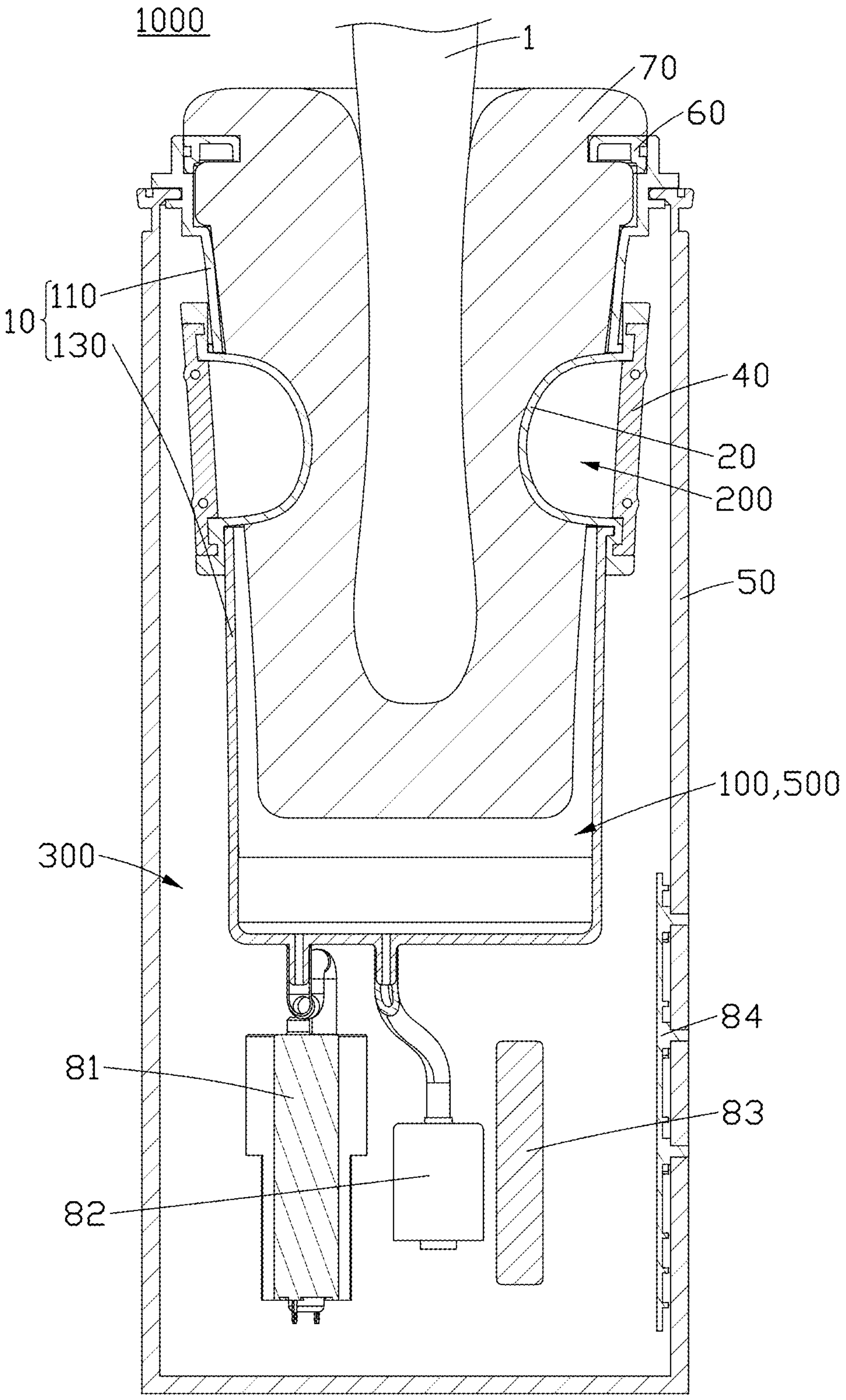
FIG. 6 is a schematic diagram showing a state of use of the negative pressure masturbator cup.

When the negative pressure masturbator cup 1000 of the present disclosure is used, as shown in FIG. 6, the penis 1 is placed in the accommodating channel 700 of the soft colloid 70. The button 841 is operated to trigger the negative pressure generator 81 to operate, and the electromagnetic valve 82 seals the controllable gas cavity 100 from the external gas. Gas in the controllable gas cavity 100 within the cup main body 101 is discharged by the negative pressure generator 81 such that the gas pressure in the controllable gas cavity 100 gradually decreases. A negative pressure is generated at one side of the elastically deformable body 20, and the two sides of the elastically deformable body 20 are under a pressure higher than the negative pressure, that is, in the atmospheric pressure state, therefore a gas pressure difference is generated between the two sides.

Under the negative pressure, the elastically deformable body 20 is elastically deformed towards the side of the accommodating channel 700, and the accommodating channel 700 of the soft colloid 70 is squeezed and deformed. As a result, the soft colloid 70 is stretched and moves towards the bottom of the cup main body 101, and the inner diameter of the soft colloid 70 narrows, providing diversified stimulating experiences to the user. In addition, since the negative pressure masturbator cup 1000 of the present disclosure has a simple structure, the hand-held operation is durable.

After use, the button 841 is operated to trigger the negative pressure generator 81 to stop operating, the electromagnetic valve 82 connects the controllable gas cavity 100 to the external gas, and the external gas flows into the controllable gas cavity 100 under a gas pressure difference until the controllable gas cavity 100 restores to the atmospheric pressure state. At this time, the soft colloid 70 is removed for easy cleaning.

The negative pressure masturbator cup 1000 of the present disclosure has an adjustable inner diameter and provide adult users with a rich and diversified sexual experience under the premise of lawfulness, privacy and compliance with public order and morality.

The invention claimed is:

1. A negative pressure masturbator cup comprising:

an accommodating cavity configured to accommodate a soft colloid, the soft colloid provided with an accommodating channel connected to an exterior of the negative pressure masturbator cup, and the accommodating channel configured to accommodate a sexual organ;

a cup main body comprising an elastically deformable body, the elastically deformable body exposed to the accommodating cavity and acting as a portion of a side wall of the cup main body; and a control structure comprising a negative pressure generator, the control structure controlling the negative pressure generator to generate a negative pressure, wherein when the control structure controls the negative pressure generator to generate the negative pressure, the soft colloid is pulled by the negative pressure generated by thea negative pressure generator, and the elastically deformable body is deformed in a direction towards the accommodating cavity.

2. The negative pressure masturbator cup according to claim 1, further comprising a controllable gas cavity between the cup main body and the soft colloid, the controllable gas cavity being sealed; wherein the negative pressure generator is connected to the controllable gas cavity, when the negative pressure generator is controlled to generate the negative pressure, gas in the controllable gas cavity is discharged, and the elastically deformable body is deformed concavely towards a side of the controllable gas cavity while the soft colloid is squeezed into the accommodating channel thereby changing an inner diameter of the accommodating channel.

3. The negative pressure masturbator cup according to claim 1, wherein when the negative pressure generator is controlled to generate the negative pressure, a gas pressure difference is generated between two sides of the elastically deformable body, and the elastically deformable body deforms towards a side of the two sides having a lower gas pressure, and when the negative pressure generator is not controlled to generate the negative pressure, a gap is defined between the elastically deformable body and the soft colloid.

4. The negative pressure masturbator cup according to claim 1, wherein the elastically deformable body is annularly arranged on the side wall of the cup main body.

5. The negative pressure masturbator cup according to claim 1, wherein the elastically deformable body comprises a plurality of elastically deformable sub-bodies, the plurality of elastically deformable sub-bodies is arranged on the side wall of the cup main body.

6. The negative pressure masturbator cup according to claim 1, wherein the elastically deformable body is made of an elastic material layer having a pre-determined width, and a thickness of the elastic material layer at a periphery region of the elastically deformable body is greater than a thickness of the elastic material layer at a middle region of the elastically deformable body, thereby forming a concave region in the middle region.

7. The negative pressure masturbator cup according to claim 1, wherein the cup main body further comprises a hard material portion connected to the elastically deformable body.

8. The negative pressure masturbator cup according to claim 7, wherein the elastically deformable body is annularly arranged on the side wall of the cup main body, the hard material portion comprises:

a cup body portion having a hardness higher than a hardness of the elastically deformable body; and a clamping member having a hardness higher than the hardness of the elastically deformable body, each end edges of the elastically deformable body is sealed by being sandwiched between the cup body portion and the clamping member, such that a wall surface of the cup body portion is sealed;

the negative pressure masturbator cup further comprising a controllable gas cavity between the cup main body and the soft colloid, the controllable gas cavity is sealed, wherein one side of the elastically deformable body communicates with the controllable gas cavity;

an airbag space is formed between another side of the elastically deformable body and the clamping member;

when the negative pressure generator is controlled to generate the negative pressure, the negative pressure is formed in the controllable gas cavity, a gas pressure in the airbag space is greater than the negative pressure in the controllable gas cavity, and the airbag space defines one or more regions, such that the elastically deformable body forms one or more structures corresponding to each of the one or more regions of the airbag space, the one or more structures of the deformable body are deformed concavely toward the side of the cup main body.

9. The negative pressure masturbator cup according to claim 8, wherein the cup body portion comprises:

a cup mouth portion forming an opening of the cup main body and covering an upper end of the elastically deformable body; and a cup bottom portion forming a cup bottom of the cup main body and covering a lower end of the elastically deformable body.

10. The negative pressure masturbator cup according to claim 1, further comprising:

a first vent and a second vent, each of the first and the second vents penetrating through the cup main body; and the control structure further comprising an electromagnetic valve, wherein when the negative pressure generator is controlled to generate the negative pressure, a gas discharge channel to discharge gas is formed from an interior of the cup main body to the first vent, and the electromagnetic valve closes the second vent to prevent air from flowing from an exterior of the cup main body into the interior of the cup main body; and when the negative pressure generator is not controlled to generate the negative pressure, the electromagnetic valve opens the second vent to allow the air to flow from the exterior of the cup main body into the interior of the cup main body through the second vent.

11. A negative pressure masturbator cup comprising:

an outer cylinder, an interior of the outer cylinder comprising an accommodating channel located at a center of the outer cylinder, wherein the accommodating channel is configured to accommodate a sexual organ;

a controllable gas cavity disposed adjacent to the accommodating channel and isolated from the accommodating channel;

a first wall surface and a second wall surface which cooperatively define the controllable gas cavity, wherein the first wall surface is opposite to the second wall surface, and the first wall surface is disposed closer to the accommodating channel than the second wall surface; and a negative pressure generator connected to the controllable gas cavity, when the negative pressure generator operates to generate a negative pressure in the controllable gas cavity, a portion of the second wall surface bulges and deforms towards the accommodating channel and squeezes the first wall surface, the first wall surface then recesses towards the center of the outer cylinder.

12. The negative pressure masturbator cup according to claim 11, further comprising:

a cup main body accommodated inside the outer cylinder and comprising an elastically deformable body, the second wall surface is an inner surface of the cup main body; and a soft colloid accommodated inside the cup main body, the first wall surface is an outer surface of the soft colloid, wherein when the negative pressure generator operates to generate the negative pressure in the controllable gas cavity, the elastically deformable body elastically deforms towards the accommodating channel, such that the inner surface of the cup main body bulges and deforms towards the accommodating channel and squeezes the first wall surface;

when the negative pressure generator turns off, the first wall surface and the elastically deformable body separate from each other.

13. The negative pressure masturbator cup according to claim 11, wherein the first wall surface has a unsqueezed portion that is not squeezed by the second wall surface when the negative pressure generator operates to generate the negative pressure in the controllable gas cavity, and the unsqueezed portion is configured to move closer to the second wall surface in a direction away from the accommodating channel when the negative pressure generator operates to generate the negative pressure in the controllable gas cavity.

14. The negative pressure masturbator cup according to claim 11, wherein the elastically deformable body is annularly arranged on a side wall of the cup main body.

15. The negative pressure masturbator cup according to claim 11, wherein the elastically deformable body comprises a plurality of elastically deformable sub-bodies, the plurality of elastically deformable sub-bodies is arranged on the side wall of the cup main body.

16. The negative pressure masturbator cup according to claim 11, wherein the elastically deformable body is made of an elastic material layer having a pre-determined width, and a thickness of the elastic material layer at a periphery region of the elastically deformable body is greater than a thickness of the elastic material layer at a middle region of the elastically deformable body, thereby forming a concave region in the middle region.

17. The negative pressure masturbator cup according to claim 11, wherein the cup main body further comprises a hard material portion connected to the elastically deformable body.

18. The negative pressure masturbator cup according to claim 17, wherein the elastically deformable body is annularly arranged on the side wall of the cup main body, the hard material portion comprises:

a cup body portion having a hardness higher than a hardness of the elastically deformable body; and a clamping member having a hardness higher than the hardness of the elastically deformable body, each end edges of the elastically deformable body is sealed by being sandwiched between the cup body portion and the clamping member, such that a wall surface of the cup body portion is sealed;

the negative pressure masturbator cup further comprising a controllable gas cavity between the cup main body and the soft colloid, the controllable gas cavity is sealed, wherein one side of the elastically deformable body communicates with the controllable gas cavity;

an airbag space is formed between another side of the elastically deformable body and the clamping member;

when the negative pressure generator is controlled to generate the negative pressure, the negative pressure is formed in the controllable gas cavity, a gas pressure in the airbag space is greater than the negative pressure in the controllable gas cavity, and the airbag space defines one or more regions, such that the elastically deformable body forms one or more structures corresponding to each of the one or more regions of the airbag space, the one or more structures of the deformable body are deformed concavely toward the side of the cup main body.

19. The negative pressure masturbator cup according to claim 18, wherein the cup body portion comprises:

a cup mouth portion forming an opening of the cup main body and covering an upper end of the elastically deformable body; and a cup bottom portion forming a cup bottom of the cup main body and covering a lower end of the elastically deformable body.

20. The negative pressure masturbator cup according to claim 11, further comprising:

a first vent and a second vent, each of the first and the second vents penetrating through the cup main body; and an electromagnetic valve, wherein when the negative pressure generator is controlled to generate the negative pressure, a gas discharge channel to discharge gas is formed from an interior of the cup main body to the first vent, and the electromagnetic valve closes the second vent to prevent air from flowing from an exterior of the cup main body into the interior of the cup main body;

and when the negative pressure generator is not controlled to generate the negative pressure, the electromagnetic valve opens the second vent to allow the air to flow from the exterior of the cup main body into the interior of the cup main body through the second vent.

* * * * *